United States Patent [19]

Hua

[11] Patent Number: 5,249,608

[45] Date of Patent: Oct. 5, 1993

[54] PROCESS AND FLUSHING DEVICE FOR REMOVING OIL FROM WASTE OIL FILTERS

[75] Inventor: Tung V. Hua, Alhambra, Calif.

[73] Assignee: Lee W. Tower, Rancho Palos Verdes, Calif. ; a part interest

[21] Appl. No.: 804,873

[22] Filed: Dec. 6, 1991

[51] Int. Cl.⁵ .................................................. B65B 3/12
[52] U.S. Cl. .......................................... 141/1; 141/65; 141/67; 141/98; 141/249; 141/363; 141/375; 141/8; 141/7; 184/106
[58] Field of Search ................... 141/65, 67, 249, 367, 141/363, 375, 98, 1, 7, 8; 184/1.5, 106; 422/900

[56] References Cited

U.S. PATENT DOCUMENTS

| | | |
|---|---|---|
| 1,509,327 | 9/1924 | Luinchester . |
| 1,781,523 | 11/1930 | Peck . |
| 1,884,820 | 10/1932 | Osborne . |
| 2,158,914 | 5/1939 | Rinehart . |
| 2,249,303 | 7/1941 | Smith . |
| 2,320,048 | 5/1943 | Parson . |
| 2,366,073 | 12/1944 | Vallerie . |
| 2,425,848 | 8/1947 | Vawter . |
| 2,454,585 | 11/1948 | Alderman . |
| 2,554,387 | 5/1951 | Stevens . |
| 2,594,779 | 4/1952 | Huffman . |
| 3,489,245 | 1/1970 | Broadwell . |
| 3,911,971 | 10/1975 | Smithsm et al. ................... 141/67 X |
| 3,916,960 | 11/1975 | Thompson ......................... 141/65 X |
| 3,994,532 | 11/1976 | Hahn ................................. 141/67 X |
| 4,174,231 | 11/1979 | Hobgood . |
| 4,508,195 | 4/1985 | Millet . |
| 4,676,206 | 6/1987 | DeGrazia . |
| 4,700,861 | 10/1987 | Neward ............................. 141/67 X |
| 4,772,431 | 10/1988 | Poling . |
| 4,776,431 | 10/1988 | Poling ............................... 141/65 X |
| 4,807,674 | 2/1989 | Sweet . |
| 4,854,277 | 8/1989 | Kenney . |
| 4,884,660 | 12/1989 | Bedi . |
| 4,907,629 | 3/1990 | Claassen ........................... 141/67 X |
| 4,949,765 | 8/1990 | Creeran ................................ 141/7 |
| 4,951,784 | 8/1990 | Bedi . |
| 4,964,373 | 10/1990 | Bedi . |
| 5,044,334 | 9/1991 | Bedi . |

Primary Examiner—Ernest G. Cusick
Attorney, Agent, or Firm—Lee W. Tower

[57] ABSTRACT

An apparatus is used to focus a stream of pressurized air into an oil filter thereby opening any one way valve in the oil filter and forcing the waste oil out of the oil filter. The oil is then drained into a sealed oil barrel. The apparatus consists of an inlet funnel at the top, a fluid collection convergence funnel and a threaded hollow discharge spigot at the bottom of the funnel, which is designed for convenient attachment into a threaded open port of a standard oil drum. The throat of the fluid collection convergence funnel above the inlet of the discharge spigot has a chamber which is fitted with a hollow threaded holder for retaining a used oil filter cartridge. The chamber has passages for directing the pressurized air connected to a conventional general service compressed air hose fitted with an on/off trigger valve. The passages connect to the inlet passages on the retained oil filter cartridge. As oil is flushed into the oil drum, fumes in the oil drum are forced through a low pressure exhaust and through an air filter, which filters the fumes before releasing the air to the atmosphere.

14 Claims, 1 Drawing Sheet

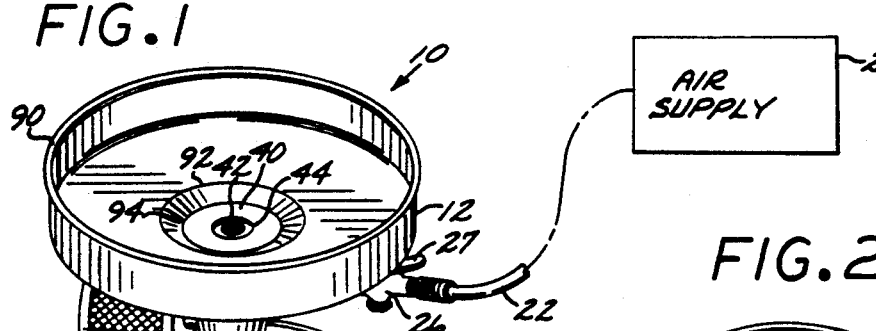
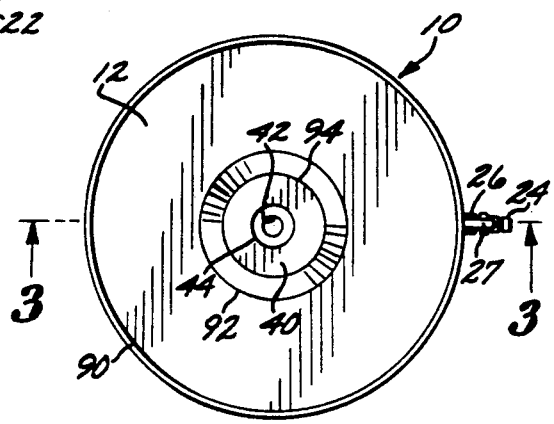
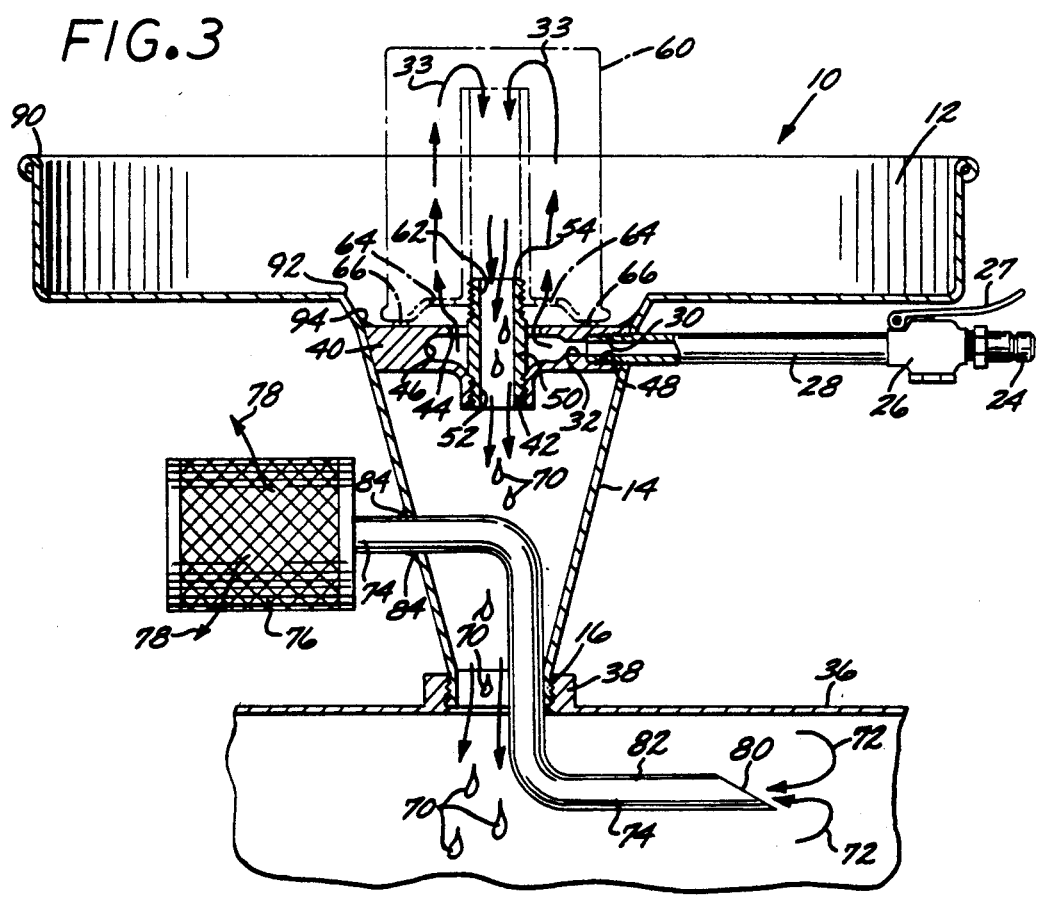

PROCESS AND FLUSHING DEVICE FOR REMOVING OIL FROM WASTE OIL FILTERS

BACKGROUND OF THE INVENTION

1. Field of the Invention

This invention relates to waste oil recovery systems and in particular a waste oil recovery system for used oil filters.

2. Prior Art

Disposal of used oil filters has long been a problem for the entire automotive service and repair industry, which is a widely dispersed industry located throughout the world. The problem of oil filter disposal is the same, whether the oil filter is used for an engine on an automobile, truck, utility vehicle, or tractor. Currently, when an oil filter is removed from an engine there is substantial oil left in the oil filter, which will not drain via gravity. The reason the oil in the oil filter will not just drain out when the removed filter is positioned so that the openings on the filter are pointed downward is that in many oil filters there is a one way valve in the filter, which must be overcome by positive oil pressure. The one way valve ensures that there is oil pressure that the oil pressure gauge can detect. Normally oil pressure is at least 4 pounds per square inch when an engine is idling. The one way valve is not always present in oil filters and depends on the manufacturer. In some cases the positive pressure is provided for in the engine in another way, but there is still a problem, if just gravity is relied upon, in completely draining the oil from a used oil filter even when there is not a one way valve in the oil filter.

Oil filters currently are an environmental hazard and require special disposal, because of the oil left in the oil filter. The special disposal requirements are rather expensive and certainly inconvenient. In addition, because the oil is not completely removed from the oil filters, handling is at best a messy proposition, because handlers are never sure that additional oil will not drip out of the oil filter. Disposal would be simplified if the waste oil in the used oil filters could be completely removed before disposal. Then possibly the oil filters could be handled as normal waste and in any event they would be much easier to handle. Another advantage is that the recovered oil could possibly be recycled for use. When the number of oil filters changed daily is considered, the recovered oil could be significant.

SUMMARY OF THE INVENTION

This invention is a novel means of removing waste oil from a used oil filter. An apparatus is used to focus a stream of pressurized air into the oil filter thereby opening any one way valve in the oil filter and forcing the waste oil out of the oil filter. The oil is then drained into a sealed oil barrel. The apparatus has built into it an air filter for filtering any fumes from the oil barrel, which are created as the waste oil fills the oil barrels. The air filter also provides an exhaust for the pressurized air. The result is a very convenient way to flush oil out of used oil filters so that their disposal is easier.

The apparatus consists of a galvanized metal inlet funnel approximately 18 inches in diameter at the upper open end. The lower end of the apparatus has a fluid collection convergence funnel with a threaded hollow discharge spigot at the bottom, which is designed for convenient attachment into a threaded open port of a standard 55 gallon oil drum. The throat of the fluid collection convergence funnel above the inlet of the discharge spigot has a chamber fitted with a hollow threaded holder for retaining a used oil filter cartridge. The chamber has passages connected to a conventional general service compressed air hose fitted with an on/off trigger valve. The passages connect to the inlet passages on the retained oil filter cartridge.

Air is discharged into the chamber passage and via the passage through the inlet passages on the oil filter cartridge thereby opening any one way valve in the oil filter and forcing the waste oil out of the oil filter and through the center of the hollow threaded holder to the fluid collection convergence funnel and finally into the oil drum. As oil is flushed into the oil drum, fumes in the oil drum are forced through a low pressure exhaust and through an air filter, which filters the fumes before releasing the air to the atmosphere. The result is a environmentally clean solution to the current waste oil filter problem.

BRIEF DESCRIPTION OF THE DRAWINGS

A better understanding of the invention and its advantages will be apparent from the detailed description taken in conjunction with the accompanying drawings in which:

FIG. 1 is a perspective drawing of a flushing device for removing oil from waste oil filters according to the present invention showing it attached to an oil drum and an air supply.

FIG. 2 is a top view of the flushing device of the present invention.

FIG. 3 is a sectional view of the flushing device of the present invention taken along line 3—3 of FIG. 2.

DESCRIPTION OF THE PREFERRED EMBODIMENTS

Referring now to the drawings, and more particularly, to FIG. 1, there is shown a flushing device 10 for removing oil from waste oil filters attached to oil drum 34 and air supply 20. To use the apparatus an oil filter cartridge 60 is mounted onto chamber 40, as shown in FIG. 3, and pressurized air is directed into the filter to flush out any oil in the filter. FIG. 1 shows the apparatus without an oil filter cartridge 60 or a hollow threaded holder 50 mounted on the apparatus. As shown in FIG. 1, the apparatus is designed to be mounted to a standard oil drum 34, which has a standard oil drum cover 36 with an oil drum threaded port 38 that is normally used for filling or emptying the oil drum 34.

When the apparatus of the present invention is used, the apparatus is threaded into the oil drum threaded port 38 and an air supply 20 is connected via a standard compressed air hose 22 to air pressure valve 26. Then an oil filter cartridge 60 is attached to the apparatus of the present invention by attaching it to hollow threaded holder 50 via oil filter outlet threaded opening 62 at holder cartridge threaded end 54. The hollow threaded holder 50 is threaded into threaded chamber throat 42 at holder chamber threaded end 52, as shown in FIG. 3. Then the user releases a few short bursts of pressurized air by pushing on/off trigger valve 27 activating air pressure valve 26 and the pressurized air enters the oil filter via air pipe 28, chamber inlet passage 32, circular inner chamber 46, circular chamber outlet passage 44 and oil filter inlet openings 64. The oil in the oil filter is pushed by the pressurized air through the filter as designated by air flow 33 to oil filter outlet threaded opening 62 and into the middle of hollow threaded holder 50 and then is collected by fluid collection convergence funnel 14 and enters the oil drum 34 through threaded hollow discharge spigot 16. The oil discharge 70 and the pressured air in oil drum 34 create fumes 72 that are vented through low pressure exhaust 74 and air filter 76, which releases filtered air 78 to the atmosphere. As the oil accumulates on the bottom of oil drum 34, the container fills. The low pressure exhaust 74 is purposefully bent horizontally along the top of the oil drum cover 36 as indicated by horizontally bent exhaust pipe 82. This together with diagonally cut upward facing exhaust pipe opening 80 ensures that the oil drum 34 can be filled as much as possible. To allow the air to properly vent, the oil level in the oil drum 34 must be kept below the lowest point on low pressure exhaust 74. When the oil drum 34 is full after flushing many oil filters, it can be sealed and hauled away for recycling and another empty barrel used.

FIG. 2 illustrates the top view of the apparatus. As shown, the inlet funnel 12 is circular, which is normal for oil pans. Starting at the outer edge of inlet funnel 12, first is inlet funnel edge 90, which provides a circular wall to prevent oil leaking out of inlet funnel 12. The slope between inlet funnel edge 90 and inlet funnel edge 92 is typically about 5 degrees; however, at inlet funnel edge 92 the slope of the inlet funnel 12 increases, as shown in FIG. 1, until funnel edge 94. Then going toward the center of FIG. 2, the next surface is the top of chamber 40, which is flat as shown in FIG. 3. Then the circular chamber outlet passage 44 is encountered, which leads to circular inner chamber 46 and air pipe 28. FIG. 2 does not have a hollow threaded holder 50 attached, so threaded chamber throat 42 is visible. The space between threaded chamber throat 42 and circular chamber outlet passage 44, which corresponds essentially to the space between hollow threaded holder 50 and circular chamber outlet passage 44, is very important, because this is the space through which the pressurized air is directed to the oil filter inlet openings 64.

FIG. 3 is a sectional view of the flushing device of the present invention taken along line 3—3 of FIG. 2. The inlet funnel 12 is attached to a fluid collection convergence funnel 14 which converges to threaded hollow discharge spigot 16. The threads on threaded hollow discharge spigot 16 are designed to mate to the threads on a standard oil drum threaded port 38. Mounted at the throat of fluid collection convergence funnel 14 is chamber 40, which has passages for focusing and directing the pressurized air and for directing the expelled oil. The threaded chamber throat 42 has typically 8 threads per inch and has a one inch diameter. The hollow threaded holder 50, which has an outer diameter of one inch and an inner diameter as low as ⅜", is threaded into threaded chamber throat 42 at the holder chamber threaded end 52. It is important that the inner diameter not be too large so that proper pressure is maintained while flushing the oil filter. At the top of chamber 40 is circular chamber outlet passage 44, which typically has a 1.5 to 2 inch diameter. This guarantees that the radial distance between hollow threaded holder 50 and circular chamber outlet passage 44 is 0.5 to 1.0 inch wide. Between threaded chamber throat 42 and circular chamber outlet passage 44 is a circular inner chamber 46, which at its maximum diameter would measure about 2 ⅜ inches corresponding to a 1.5 inch circular chamber outlet passage 44. The circular inner chamber 46 receives the pressurized air from air pipe 28 via chamber inlet passage 32, which connects to air pipe 28, which is threaded at air pipe threaded end 30 into chamber air pipe threads 48.

When an oil filter is mounted on the flushing device, the threaded opening in the oil filter is threaded onto hollow threaded holder 50 at holder cartridge threaded end 54. As the oil filter cartridge 60 is screwed onto hollow threaded holder 50, oil filter gasket 66 forms a seal to the top of chamber 40. Thus, when pressurized air is directed into circular inner chamber 46, the pressurized air goes through the space between hollow threaded holder 50 and circular inner chamber 46 and is forced through oil filter inlet openings 64. Any one way valve in the oil filter cartridge 60 is opened and the oil in the filter is forced to oil filter outlet threaded opening 62, through the center of hollow threaded holder 50, into the fluid collection convergence funnel 14 and finally through threaded hollow discharge spigot 16 and into oil drum 34.

The fumes 72 leave oil drum 34 via low pressure exhaust 74. As explained before there is a portion of low pressure exhaust 74, the horizontally bent exhaust pipe 82, which is designed in order to maximize the amount of oil that can be stored in oil drum 34. The low pressure exhaust 74 is routed through the center of threaded hollow discharge spigot 16, which has a wider diameter than low pressure exhaust 74 so that the flow of oil discharge 7 is not impeded. The low pressure exhaust 74 can be welded to the inside of threaded hollow discharge spigot 16 and also to the fluid collection convergence funnel 14 at weld joint 84, which surrounds the low pressure exhaust 74 at the fluid collection convergence funnel 14 joint, thereby sealing that joint. At the outer end of low pressure exhaust 74, an air filter 76 is attached. The fumes 72 are filtered by air filter 76 and filtered air 78 is released to the atmosphere.

Throughout the foregoing description it was assumed that pressurized air would be used to flush the waste oil from used oil filters; however, any other pressurized gas could be used and the invention is by no means limited to the use of air, although it has many advantages, including availability and price.

In summary, the flushing device 10 for removing oil from waste oil filters provides a convenient and effective solution to disposal of waste oil filters. Heretofore there has been no solution except for special and expensive disposal of spent oil filters. The flushing device 10 for removing oil from waste oil filters provides an environmental solution to this long standing problem.

It is thought that the present invention and many of its attendant advantages will be understood from the foregoing description and it will be apparent that various changes may be made in the form, construction and arrangement of the parts thereof and in the methods used without departing from the spirit and scope of the invention or sacrificing all of its material advantages, the forms hereinbefore described being merely a preferred or exemplary embodiments thereof.

I claim:

1. An apparatus for removing oil from waste oil filters having oil filter inlets and an oil filter outlet comprising:
   inlet adapting means for coupling said apparatus to said oil filter inlets of an oil filter;
   outlet adapted means for coupling said apparatus to said oil filter outlet of an oil filter;
   means coupled to said inlet adapting means for directing pressurized gas into said oil filter inlets; and means coupled to said outlet adapting means for collecting oil discharged from said oil filter outlet.

2. The apparatus of claim 1 wherein said means for directing pressurized gas into said oil filter inlets comprises:
   a chamber having an inner chamber;
   a pressurized gas source coupled to said inner chamber; and
   a chamber outlet passage coupled to said inner chamber; and
   wherein when an oil filter is coupled to said inlet adapting means than said chamber outlet passage is coupled to said oil filter inlets.

3. The apparatus of claim 2 that further comprises:
   a low pressure exhaust coupled to said means for collecting oil discharge from said oil filter outlet; and
   a means for purifying exhausted gas coupled to said low pressure exhaust.

4. The apparatus of claim 3 wherein said means for collecting oil discharged from said oil filter outlet comprises:
   a fluid collection funnel; and
   an oil drum coupled to said fluid collection funnel.

5. The apparatus of claim 4 wherein said means for purifying exhausted gas comprises a gas filter.

6. An apparatus for removing oil from waste oil filters having oil filter inlets and an oil filter outlet comprising:
   a chamber having an inner chamber and a first side and a second side;
   a chamber inlet passage coupled to said inner chamber;
   a chamber outlet passage on said first side of said chamber coupled to said inner chamber;
   wherein when an oil filter is coupled to said apparatus then said chamber outlet passage is coupled to sad oil filter inlets;
   a means for providing pressurized gas coupled to said chamber inlet passage;
   a chamber throat on said second side of said chamber;
   a hollow holder coupled to said chamber throat and extending through said chamber outlet passage;
   wherein when an oil filter is coupled to said apparatus then said hollow holder is coupled to said oil filter outlet on an oil filter;
   wherein said hollow holder coupled to said chamber throat and extending through said chamber outlet passage does not block the coupling of said chamber outlet passage to said oil filter inlets when an oil filter is coupled to said apparatus; and
   a means coupled to said hollow holder for collecting oil discharged from said oil filter outlet.

7. The apparatus of claim 6 wherein said hollow holder coupled to said chamber throat and extending through said chamber outlet passage further comprises:
   threads on said chamber throat; and
   mating threads on said hollow holder to permit said hollow holder to be threaded into said chamber throat.

8. The apparatus of claim 6 wherein:
   when an oil filter is coupled to said apparatus said first side of said chamber can be adapted to an oil filter gasket surrounding said oil filter inlets so that pressurized gas directed into said chamber inlet passage flows through said inner chamber, through said chamber outlet passage and into said oil filter inlets without leaking and said pressurized gas forces any oil in said oil filter to said oil filter outlet and through the center of said hollow holder.

9. The apparatus of claim 8 further comprising:
   a low pressure exhaust having an inlet end coupled to said means for collecting oil and having an extension extending from said means for collecting oil; and
   a gas filter for filtering fumes in said low pressure exhaust coupled to said extension.

10. The apparatus of claim 9 wherein said means for collecting oil coupled to said hollow holder further comprises:
    a fluid collection funnel coupled to said hollow holder; and
    an oil drum coupled to said fluid collection funnel.

11. The apparatus of claim 10 wherein said low pressure exhaust comprises an exhaust pipe that extends parallel to the top of said oil drum and then makes a right angle and passes into said fluid collection funnel and then exits through a wall of said fluid collection funnel.

12. The apparatus of claim 11 further comprising:
    threads on an end of said hollow holder threaded to be compatible with the threads on an oil filter outlet.

13. The apparatus of claim 12 wherein said fluid collection funnel has a threaded hollow discharge spigot that can be threaded onto a standard oil drum threaded port.

14. A method for removing oil from waste oil filters having oil filter inlets and an oil filter outlet comprising the steps of:
    providing inlet adapting means for coupling to said oil filter inlets of an oil filter;
    providing outlet adapting means for coupling to said oil filter outlet of an oil filter;
    providing means coupled to said inlet adapting means for directing pressurized gas into said oil filter inlets; and
    providing means coupled to said outlet adapting means for collecting oil discharged from said oil filter outlet.

* * * * *